(12) United States Patent
Sridharan et al.

(10) Patent No.: US 12,135,625 B2
(45) Date of Patent: Nov. 5, 2024

(54) DEVICES, SYSTEMS, AND METHODS FOR INJECTING FABRICATED ERRORS INTO MACHINE CHECK ARCHITECTURES

(71) Applicant: Advanced Micro Devices, Inc., Santa Clara, CA (US)

(72) Inventors: Vilas Sridharan, Boxborough, MA (US); Hanbing Liu, Austin, TX (US); Francisco L. Duran, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 69 days.

(21) Appl. No.: 18/089,135

(22) Filed: Dec. 27, 2022

(65) Prior Publication Data
US 2024/0211362 A1    Jun. 27, 2024

(51) Int. Cl.
*G06F 11/26* (2006.01)
*G06F 11/07* (2006.01)

(52) U.S. Cl.
CPC ........ *G06F 11/261* (2013.01); *G06F 11/0784* (2013.01); *G06F 11/0787* (2013.01)

(58) Field of Classification Search
CPC . G06F 11/261; G06F 11/0784; G06F 11/0787
USPC ................................................. 714/33, 41
See application file for complete search history.

(56) References Cited

U.S. PATENT DOCUMENTS

| | | | |
|---|---|---|---|
| 2006/0112307 A1* | 5/2006 | Marisetty | G06F 11/3672 714/11 |
| 2011/0179311 A1* | 7/2011 | Nachimuthu | G06F 11/3676 714/E11.144 |
| 2012/0216078 A1 | 8/2012 | Albot et al. | |
| 2013/0151930 A1 | 6/2013 | Yigzaw et al. | |
| 2013/0275810 A1 | 10/2013 | Yigzaw et al. | |
| 2014/0380085 A1* | 12/2014 | Rash | G06F 11/1415 714/49 |
| 2019/0130991 A1 | 5/2019 | Son et al. | |
| 2021/0089418 A1 | 3/2021 | Das Sharma | |
| 2023/0185663 A1* | 6/2023 | Wang | G06F 11/261 714/764 |

OTHER PUBLICATIONS

International Search Report and Written Opinion from corresponding International Application No. PCT/US2023/085931, dated Apr. 30, 2024 (9 pages).

* cited by examiner

*Primary Examiner* — Chae M Ko
(74) *Attorney, Agent, or Firm* — Greenberg Traurig, LLP (57) ABSTRACT

An exemplary system includes and/or represents an agent and a machine check architecture. In one example, the machine check architecture includes and/or represents at least one circuit configured to report errors via at least one reporting register. In this example, the machine check architecture also includes and/or represents at least one error-injection register configured to cause the circuit to inject at least one fabricated error report into the reporting register in response to a write operation performed by the agent on at least one bit of the error-injection register. Various other devices, systems, and methods are also disclosed.

20 Claims, 8 Drawing Sheets

DEVICES, SYSTEMS, AND METHODS FOR INJECTING FABRICATED ERRORS INTO MACHINE CHECK ARCHITECTURES

BACKGROUND

Machine check architectures are often used to report errors to operating systems running on processors. For example, a system on a chip (SoC) includes and/or represents various processors along with a machine check architecture that detects and/or reports errors to one or more of the processors. In this example, a user and/or administrator of the SoC may want and/or need to test the effect(s) of one or more errors on their firmware, software, and/or flows running on the processors. Unfortunately, such testing can be impractical, unfeasible, and/or unscalable as the number of error detectors included in the machine check architecture expands and/or increases. The instant disclosure, therefore, identifies and addresses a need for additional and improved devices, systems, and methods for injecting fabricated errors into machine check architectures.

BRIEF DESCRIPTION OF THE DRAWINGS

The accompanying drawings illustrate a number of exemplary implementations and are a part of the specification. Together with the following description, these drawings demonstrate and explain various principles of the instant disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the instant disclosure covers all modifications, equivalents, and alternatives falling within the scope of the appended claims.

DETAILED DESCRIPTION OF EXEMPLARY IMPLEMENTATIONS

The present disclosure describes various devices, systems, and methods for injecting fabricated errors into machine check architectures. In some examples, SoCs implement machine check architectures with error detectors that are modified to inject fabricated errors for testing and/or validation purposes. Unfortunately, some configurations of machine check architectures necessitate bespoke logic for all of their modified error detectors. In certain implementations, such bespoke logic is not scalable because the SoCs can include and/or implement thousands of error detectors that utilize the machine check architectures for error reporting.

To address this problem, an SoC can provide and/or implement a register that accessible to privileged out-of-band agents. When a certain portion of this register is written to, the SoC hardware (e.g., a hardware block and/or circuit in the machine check architecture) purposefully causes a fabricated error for injection into a logging pipeline of the machine check architecture. The SoC hardware can select and/or customize which error(s) to fabricate and/or inject into the logging pipeline of the machine check architecture to suit a specific purpose and/or test a certain functionality. Using the SoC hardware to select and/or customize such errors for fabrication and/or injection, a user and/or administrator of the SoC can deploy, create, and/or establish a robust platform to test and/or validate their software and/or firmware against the errors. Alternatively, the SoC hardware can write a fabricated error to the registers in the machine check architecture directly without necessarily pushing the errors down the logging pipeline.

In some examples, a system includes and/or represents an agent and a machine check architecture. In one example, the machine check architecture includes and/or represents at least one circuit configured to report errors via at least one reporting register. In this example, the machine check architecture also includes and/or represents at least one error-injection register configured to cause the circuit to inject at least one fabricated error report into the reporting register in response to a write operation performed by the agent on at least one bit of the error-injection register.

In some examples, the circuit includes and/or represents a plurality of circuits, and the error-injection register includes and/or represents a plurality of error-rejection registers. In one example, the machine check architecture includes and/or represents a pipeline configured to carry the error reports from the circuit to the reporting register. In this example, the error-injection register is configured to cause the circuit to inject the fabricated error report into the pipeline for transmission to the reporting register.

In some examples, the circuit includes and/or represents one or more wires configured to communicate another fabricated error report from an outside source to the reporting register via the pipeline. In one example, the reporting register includes and/or represents a first reporting register and a second reporting register. In this example, the first reporting register is configured to receive a first copy of the fabricated error report via a first lane of the pipeline and store the first copy of the fabricated error report for access by an in-band processor. Additionally or alternatively, the second reporting register is configured to receive a second copy of the fabricated error report via a second lane of the pipeline and/or store the second copy of the fabricated error report for access by an out-of-band controller.

In some examples, the agent includes and/or represents software or firmware running on a processor with access to the error-injection register. In one example, the system also includes and/or represents an integrated circuit that incorporates the processor and the machine check architecture. Additionally or alternatively, the agent includes and/or represents an out-of-band controller with access to the error-injection register.

In some examples, the system also includes and/or represents a first integrated circuit that incorporates the out-of-band controller as well as a second integrated circuit that incorporates the machine check architecture. In one example, the out-of-band controller includes and/or represents a baseboard management controller that is external to the second integrated circuit.

In some examples, the circuit includes and/or represents a table configured to store a plurality of error entries and map the bit of the error-injection register to a specific error entry included in the error entries. In such examples, the circuit is configured to generate the fabricated error report for injection based at least in part on the mapping of the bit to the specific error entry.

In some examples, the error-injection register is further configured to cause the circuit to inject another fabricated error report into the reporting register in response to another write operation performed by the agent on at least one other bit of the error-injection register. In one example, the system also includes and/or represents an out-of-band controller configured to perform a specific action in response to a specific error identified in the fabricated error report injected into the reporting register. For example, the specific action includes and/or represents triggering an interrupt that notifies at least one other circuit of the specific error.

In some examples, the other circuit includes and/or represents a processor disposed on an integrated circuit equipped with the machine check architecture. In such examples, the other circuit also includes and/or represents a baseboard management controller that is external to an integrated circuit that includes the machine check architecture.

In some examples, a machine check architecture includes and/or represents at least one circuit configured to report errors to a reporting register and a pipeline configured to carry the error reports from the circuit to the reporting register. In such examples, the machine check architecture includes and/or represents at least one error-injection register configured to cause the circuit to inject at least one fabricated error report into the reporting register via the pipeline in response to a write operation performed by an outside source on at least one bit of the error-injection register.

In some examples, a method includes and/or represents configuring at least one error-injection register of a circuit in a machine check architecture. In such examples, the method also includes and/or represents detecting a write operation performed on at least one bit of the error-injection register. In one example, the method further includes and/or represents injecting at least one fabricated error report into at least one reporting register in the machine check architecture in response to the write operation.

The following will provide, with reference to FIGS. 1-7, detailed descriptions of exemplary devices, systems, and/or corresponding implementations for injecting fabricated errors into machine check architectures. Detailed descriptions of an exemplary method for injecting fabricated errors into machine check architectures will be provided in connection with FIG. 8.

Figure 1:
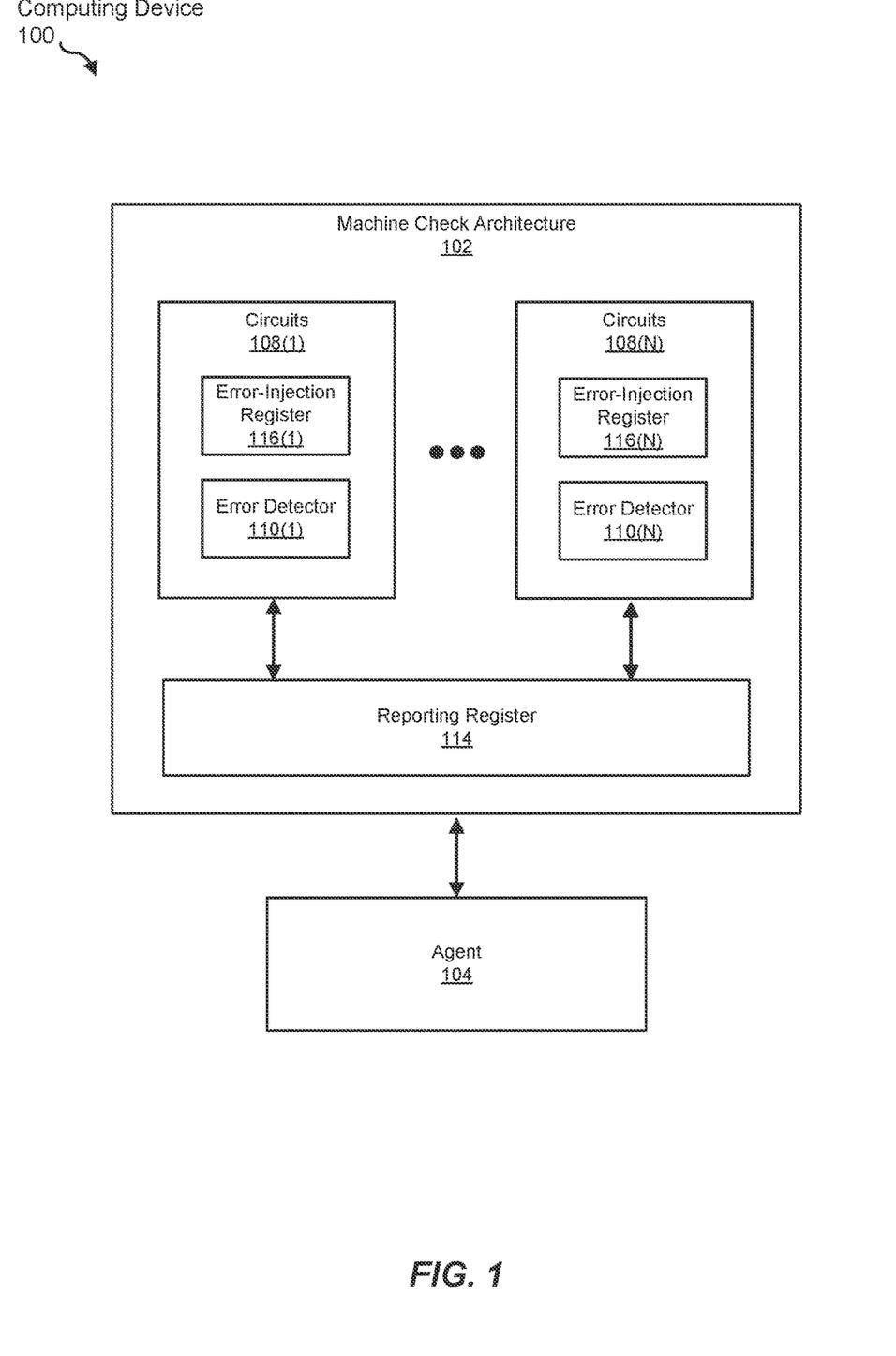
FIG. 1 is a block diagram of a portion of an exemplary computing device capable of injecting fabricated errors into machine check architectures according to one or more implementations of this disclosure.

FIG. 1 illustrates an exemplary computing device 100 that facilitates and/or supports injecting fabricated errors into machine check architectures. As illustrated in FIG. 1, exemplary computing device 100 includes and/or represents a machine check architecture 102 and an agent 104. In some examples, machine check architecture 102 and agent 104 are electrically and/or communicatively coupled to machine check architecture 102. In one example, machine check architecture 102 includes and/or represents a plurality of circuits 108(1)-(N) and at least one reporting register 114. In this example, circuits 108(1)-(N) include and/or represent error detectors 110(1)-(N) and error-injection registers 116(1)-(N), respectively. In certain implementations, error detectors 110(1)-(N) detect errors that occur in circuits 108(1)-(N), respectively, and/or report the errors to agent 104, one or more in-band processors, and/or one or more out-of-band controllers via reporting register 114.

In some examples, machine check architecture 102 can include and/or represent a circuit, device, and/or hardware mechanism that detects and/or reports errors to another circuit, device, and/or hardware mechanism. For example, an SoC can include and/or implement machine check architecture 102 as well as various processors and/or central processing unit (CPU) cores. In this example, machine check architecture 102 is configured and/or programmed to monitor hardware errors that occur in circuits 108(1)-(N), the processors or CPU cores implemented on the SoC, and/or other features or components of the SoC.

In some examples, circuits 108(1)-(N) include and/or represent hardware blocks and/or banks of machine check architecture 102. In one example, the hardware blocks and/or banks include and/or represent memory controllers and/or CPU cores. Additionally or alternatively, the hardware blocks and/or banks include and/or represent control registers and/or model-specific registers used to check for, detect, and/or record various hardware and/or machine errors. Examples of such errors include, without limitation, memory or cache errors, buffer errors, translation errors, parity errors, system bus errors, error-correcting code (ECC) faults, error detection and correction (EDAC) faults, communication errors, input/output (I/O) errors, portions of one or more of the same, combinations or variations of one or more of the same, and/or any other detectable errors. Circuits 108(1)-(N) can be configured and/or programmed to generate and/or issue fabricated error reports indicating any of these errors in response to one or more bits being written to and/or modified in error-injection registers 116(1)-(N), respectively.

In some examples, agent 104 includes and/or represents a hardware-implemented device and/or circuit capable of executing firmware, an operating system, and/or user applications. Additionally or alternatively, agent 104 includes and/or represents software and/or firmware running on a hardware-implemented device and/or circuit. In one example, agent 104 can include and/or represent software and/or firmware running on an in-band processor implemented on an SoC equipped with machine check architecture 102. In another example, agent 104 can include and/or represent an out-of-band controller that interfaces and/or communicates with an SoC equipped with machine check architecture 102. Additionally or alternatively, agent 104 can include and/or represent software and/or firmware running on such an out-of-band controller.

In some examples, error-injection registers 116(1)-(N) cause and/or direct circuits 108(1)-(N), respectively, to inject and/or insert one or more fabricated error reports into reporting register 114. In one example, the injection and/or insertion of a fabricated error report occurs in response to a write operation performed by agent 104 on one or more of error-injection registers 116(1)-(N). For example, agent 104 writes and/or modifies one or more bits of error-injection register 116(1). In response to this writing and/or modification of such bits, error-injection register 116(1) can cause and/or direct error detector 110(1) and/or circuit 108(1) to inject and/or insert a fabricated error report into reporting register 114. The fabricated error report can correspond to, represent, and/or reflect a spoofed error associated with the bit(s) affected by the write operation.

In some examples, agent 104 and/or another out-of-band component can obtain, receive, and/or retrieve the fabricated error report from reporting register 114. In such examples, agent 104 and/or another out-of-band component can process and/or consume the fabricated error report to test whether all the relevant features and/or components of machine check architecture 102 are working and/or functioning as expected. In one example, agent 104 and/or the other out-of-band component can notify a user of computing device 100 about any features and/or components of machine check architecture 102 that are identified as not working and/or functioning as expected based at least in part on the test. Additionally or alternatively, agent 104 and/or the other out-of-band component can perform one or more remedial actions to address and/or fix any features and/or components of machine check architecture 102 that are identified as not working and/or functioning as expected based at least in part on the test.

Figure 2:
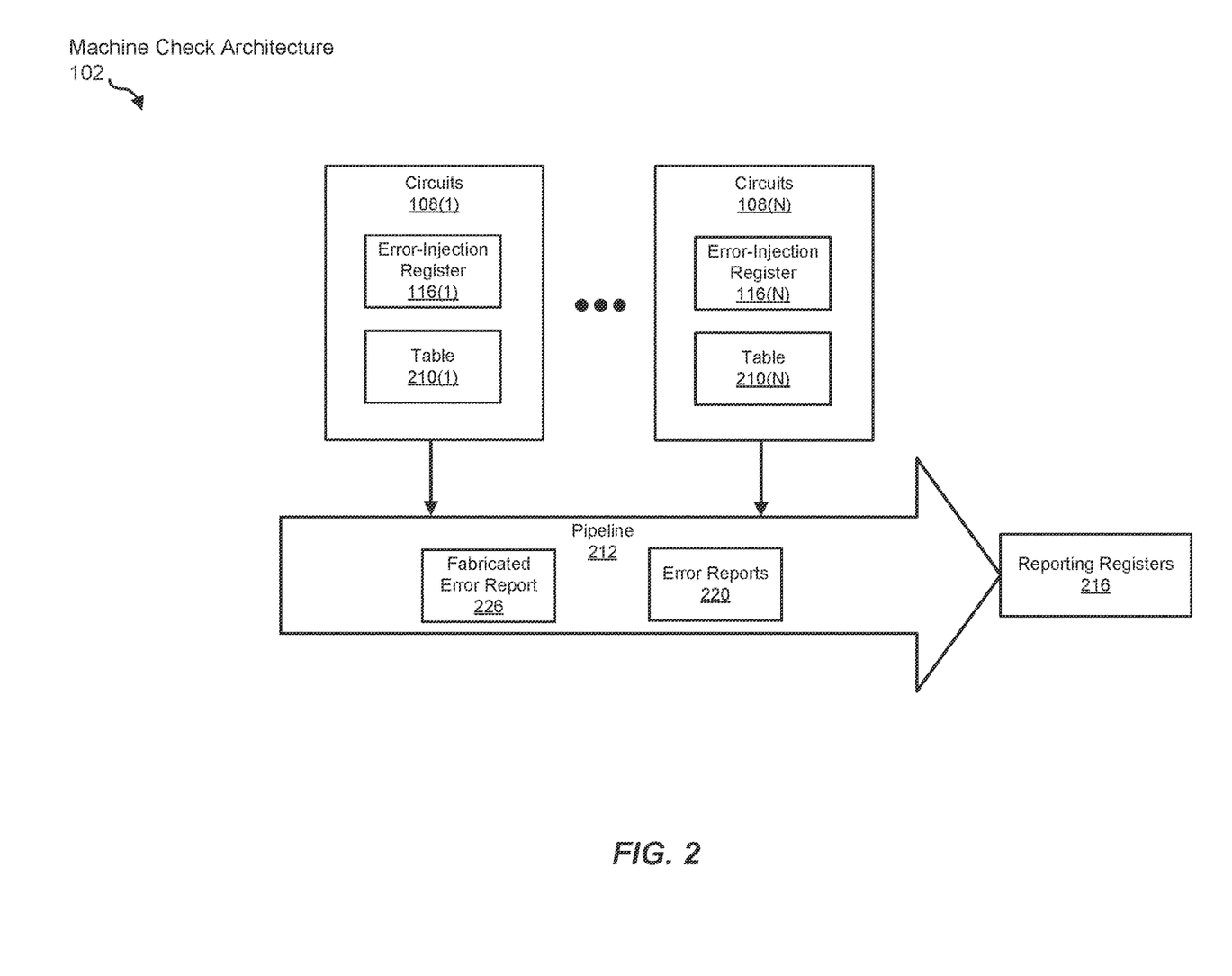
FIG. 2 is a block diagram of an exemplary machine check architecture that supports and/or facilitates injecting fabricated errors into machine check architectures according to one or more implementations of this disclosure.

FIG. 2 illustrates an exemplary implementation of machine check architecture 102 that facilitates and/or supports injecting fabricated errors. In some examples, machine check architecture 102 can include and/or represent certain components and/or features that perform and/or provide functionalities that are similar and/or identical to those described above in connection with FIG. 1. As illustrated in FIG. 2, exemplary machine check architecture 102 includes and/or represents a pipeline 212 that carries, transports, and/or transfers error reports 220 from circuits 108(1)-(N) to reporting registers 216.

In some examples, error-injection registers 116(1)-(N) can cause and/or direct circuits 108(1)-(N), respectively, to inject fabricated error reports into pipeline 212 for transmission to one or more of reporting registers 216. In one example, circuits 108(1)-(N) include and/or represent tables 210(1)-(N), respectively. In this example, tables 210(1)-(N) can each store a plurality of error entries and/or map one or more bits of error-injection registers 116(1)-(N), respectively, to those error entries.

For example, if agent 104 writes to at least one bit of error-injection register 116(1), circuit 108(1) can reference table 210(1) to identify which error to fabricate and/or report to reporting registers 216. In this example, the mapping can indicate and/or specify the error corresponding to and/or associated with that bit of error-injection register 116(1). Continuing with this example, error detector 110(1) and/or circuit 108(1) can generate a fabricated error report 226 based at least in part on the mapping of that bit to the specific error entry of table 210(1). Additionally or alternatively, error detector 110(1) and/or circuit 108(1) can then inject and/or insert fabricated error report 226 into pipeline 212 for transmission to reporting registers 216.

Similarly, if agent 104 writes to another bit of error-injection register 116(1), circuit 108(1) can reference table 210(1) to identify which other error to fabricate and/or report to reporting registers 216. In this example, the mapping can indicate and/or specify the other error corresponding to and/or associated with that other bit of error-injection register 116(1). Continuing with this example, error detector 110(1) and/or circuit 108(1) can generate another fabricated error report based at least in part on the mapping of that other bit to the other specific error entry of table 210(1). Additionally or alternatively, error detector 110(1) and/or circuit 108(1) can then inject and/or insert the other fabricated error report that specifies that other error into pipeline 212 for transmission to reporting registers 216.

In some examples, error-injection registers 116(1)-(N) and/or tables 210(1)-(N) can be configurable and/or programmable to facilitate testing and/or validating a certain functionality of machine check architecture 102. For example, agent 104 and/or another feature of computing device 100 can configure and/or program error-injection register 116(1) and/or table 210(1) to achieve a certain mapping between the bits of error-injection register 116(1) and a specific error. In this example, agent 104 and/or another feature of computing device 100 can reconfigure and/or reprogram error-injection register 116(1) and/or table 210(1) dynamically and/or as necessary to test and/or validating a certain functionality of machine check architecture.

Figure 3:
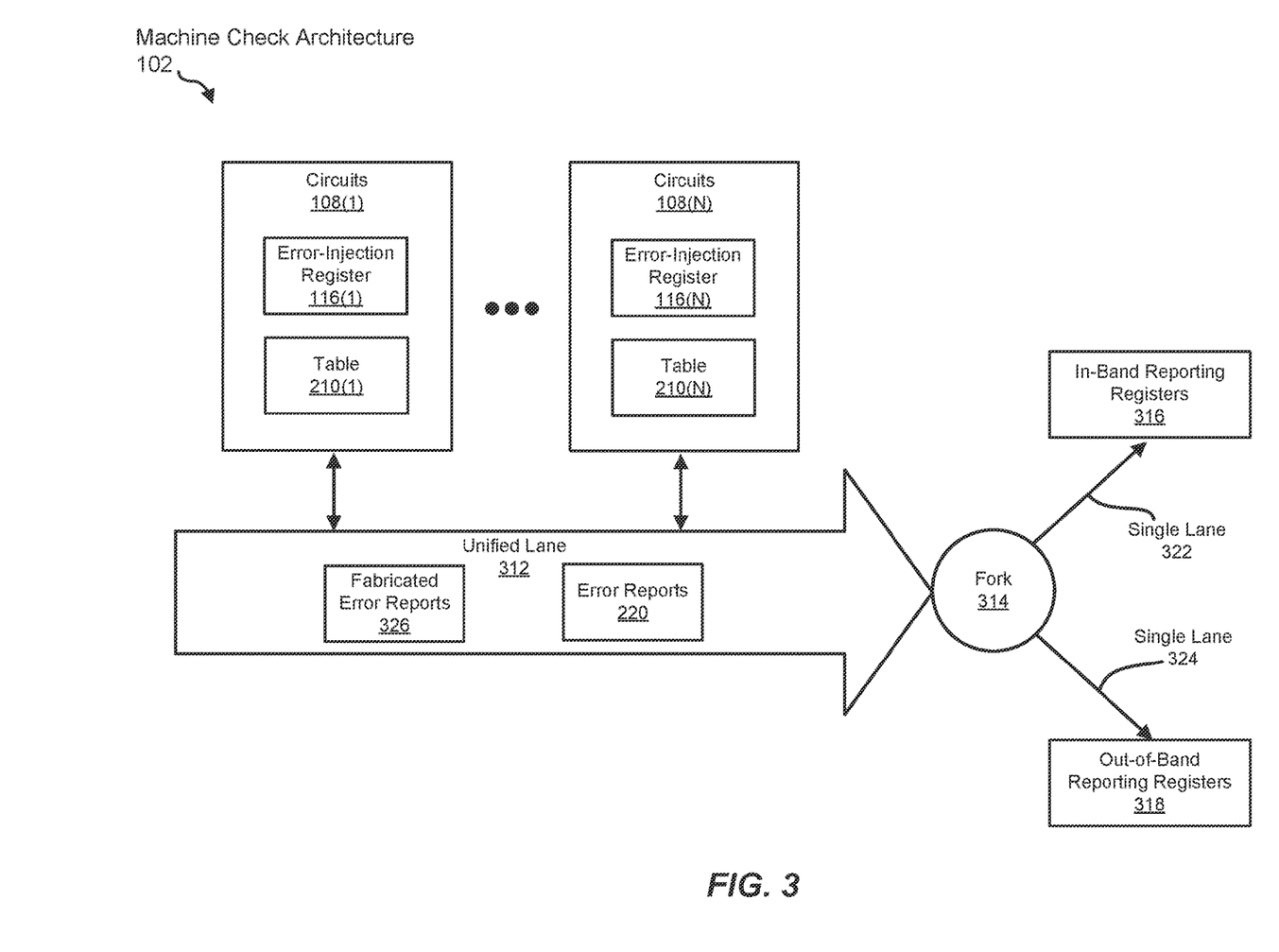
FIG. 3 is a block diagram of an exemplary computing device capable of injecting fabricated errors into machine check architectures according to one or more implementations of this disclosure.

FIG. 3 illustrates another exemplary implementation of machine check architecture 102 that facilitates and/or supports injecting fabricated errors. In some examples, machine check architecture 102 can include and/or represent certain components and/or features that perform and/or provide functionalities that are similar and/or identical to those described above in connection with either of FIGS. 1 and 2. As illustrated in FIG. 3, exemplary machine check architecture 102 also includes and/or represents one or more in-band reporting registers 316 and/or out-of-band reporting registers 318.

In some examples, pipeline 212 of machine check architecture 102 includes and/or represents a unified lane 312, a fork 314, a single lane 322, and/or a single lane 324. In this example, unified lane 312 carries and/or transports error reports 220 and/or fabricated error reports 326 toward both in-band reporting registers 316 and out-of-band reporting registers 318. In one example, single lane 322 can electrically and/or communicatively couple fork 314 to in-band reporting registers 316. Additionally or alternatively, single lane 324 can electrically and/or communicatively couple fork 314 to out-of-band reporting registers 318.

In some examples, unified lane 312 is electrically and/or communicatively coupled to fork 314. In such examples, unified lane 312 feeds and/or delivers error reports 220 and/or fabricated error reports 326 to fork 314, which duplicates and/or copies error reports 220 and/or fabricated error reports 326. For example, fork 314 splits and/or divides unified lane 312 into a single lane 322 and a single lane 324. In this example, single lane 322 carries and/or transports one copy of error reports 220 and/or fabricated error reports 326 to in-band reporting registers 316, and single lane 324 carries and/or transports another copy of error reports 220 and/or fabricated error reports 326 to out-of-band reporting registers 318.

In some examples, error detectors 110(1)-(N) monitor for and/or detect certain errors in and/or via circuits 108(1)-(N), respectively. In such examples, one or more of error detectors 110(1)-(N) generate and/or issue error reports 220 in response to the detection of such errors. In one example, error detectors 110(1)-(N) can send and/or transmit error reports 220 and/or fabricated error reports 326 toward both in-band reporting registers 316 and out-of-band reporting registers 318 via pipeline 112. For example, error reports 220 and/or fabricated error reports 326 can traverse and/or travel from one or more of circuits 108(1)-(N) to fork 314 via unified lane 312. In this example, fork 314 can duplicate and/or copy error reports 220 and/or fabricated error reports 326 for transmission to both in-band reporting registers 316 and out-of-band reporting registers 318. Accordingly, one copy of error reports 220 and/or fabricated error reports 326 can traverse and/or travel from fork 314 to in-band reporting registers 316 via single lane 322, and another copy of error reports 220 and/or fabricated error reports 326 can traverse and/or travel from fork 314 to out-of-band reporting registers 318 via single lane 324.

In some examples, in-band reporting registers 316 receive one copy of error reports 220 and/or fabricated error reports 326 and store that copy of error reports 220 and/or fabricated error reports 326 for access by agent 104 and/or an in-band processor. Additionally or alternatively, out-of-band reporting registers 318 receive another copy of error reports 220 and/or fabricated error reports 326 and store that copy of error reports 220 and/or fabricated error reports 326 for access by agent 104 and/or an out-of-band controller.

Figure 4:
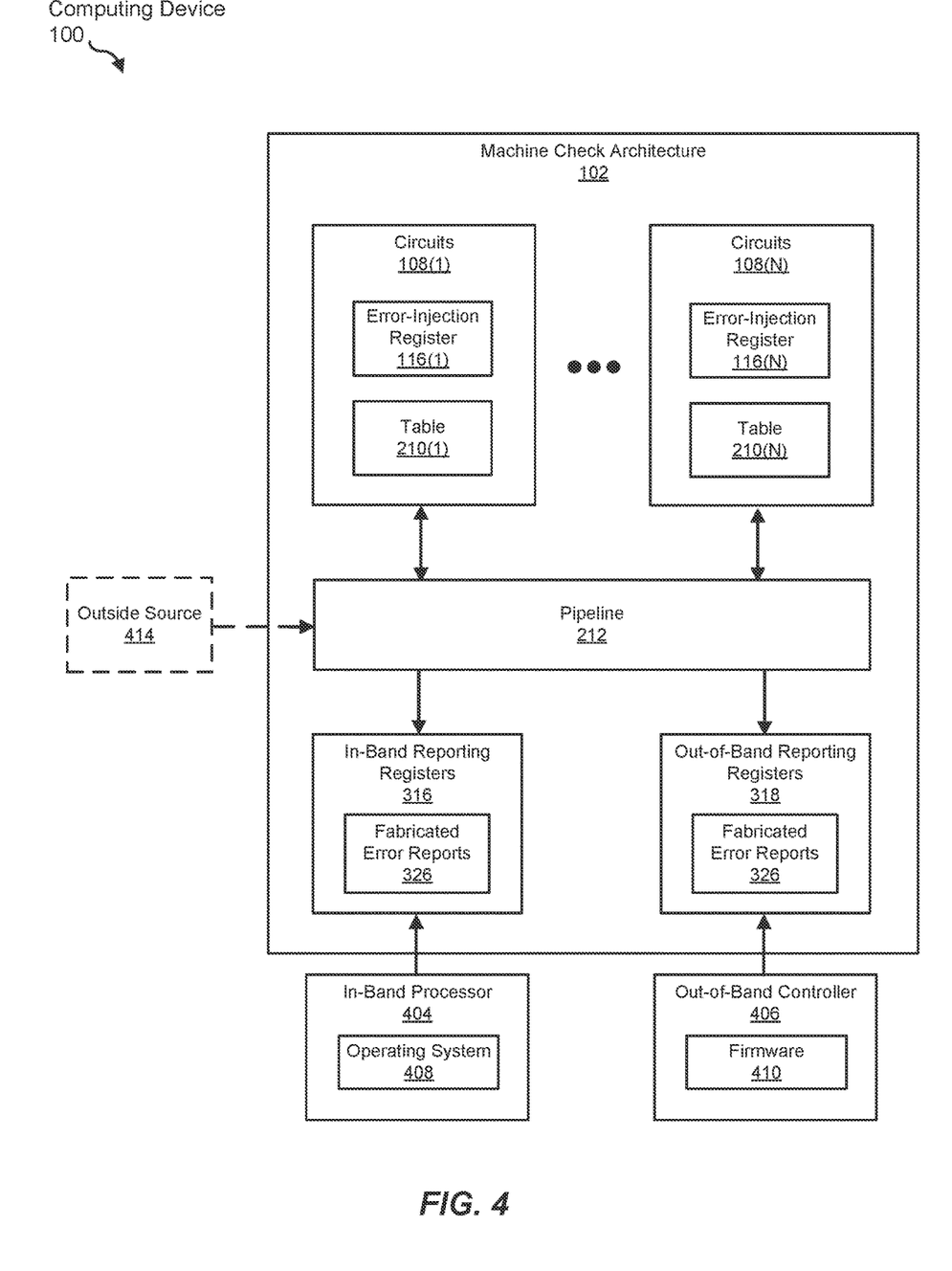
FIG. 4 is a block diagram of an exemplary computing device capable of injecting fabricated errors into machine check architectures according to one or more implementations of this disclosure.

FIG. 4 illustrates an exemplary implementation of computing device 100 that facilitates and/or supports injecting fabricated errors into machine check architectures. In some examples, computing device 100 can include and/or represent certain components and/or features that perform and/or provide functionalities that are similar and/or identical to those described above in connection with any of FIGS. 1-3. In one example, computing device 100 includes and/or represents machine check architecture 102, an in-band processor 404, an out-of-band controller 406, and/or an outside source 414. In this example, machine check architecture 102 can be electrically and/or communicatively coupled to an in-band processor 404, an out-of-band controller 406, and/or an outside source 414.

In some examples, agent 104 can include and/or represent an in-band processor 404 that implements and/or executes an operating system 408. In one example, operating system 408 can cause and/or direct in-band processor 404 to obtain, receive, and/or retrieve the copy of fabricated error reports 326 from in-band reporting registers 316. Additionally or alternatively, agent 104 can include and/or represent software and/or firmware running on in-band processor 404. In this example, in-band processor 404 has and/or maintains access to one or more of in-band reporting registers 316. In certain implementations, in-band processor 404 and/or operating system 408 processes and/or consumes the copy of fabricated error reports 326 to test whether all the relevant features and/or components of machine check architecture 102 are working and/or functioning as expected.

Additionally or alternatively, agent 104 can include and/or represent an out-of-band controller 406 that implements and/or executes firmware 410. In one example, firmware 410 can cause and/or direct out-of-band controller 406 to obtain, receive, and/or retrieve the copy of fabricated error reports 326 from out-of-band reporting registers 318. In this example, out-of-band controller 406 has and/or maintains access to one or more of out-of-band reporting registers 318. In certain implementations, out-of-band controller 406 and/or firmware 410 processes and/or consumes the copy of fabricated error reports 326 to test whether all the relevant features and/or components of machine check architecture 102 are working and/or functioning as expected.

In some examples, in-band processor 404 can include and/or represent a hardware-implemented device and/or circuit capable of executing firmware, an operating system, and/or user applications. For example, in-band processor 404 can include and/or represent a graphics processing unit (GPU) and/or a CPU. In this example, in-band processor 404 can include and/or represent one of several processors (e.g., several x86 processors) implemented and/or disposed on an SoC. Additional examples of in-band processor 404 include, without limitation, parallel accelerated processors, tensor cores, microprocessors, microcontrollers, field-programmable gate arrays (FPGAs), application-specific integrated circuits (ASICs), integrated circuits, chiplets, portions of one or more of the same, variations or combinations of one or more of the same, and/or any other suitable in-band processor.

In-band processor 404 can implement and/or be configured with any of a variety of different architectures and/or microarchitectures. For example, in-band processor 404 can implement and/or be configured as a reduced instruction set computer (RISC) architecture. In another example, in-band processor 404 can implement and/or be configured as a complex instruction set computer (CISC) architecture. Additional examples of such architectures and/or microarchitectures include, without limitation, 16-bit computer architectures, 32-bit computer architectures, 64-bit computer architectures, x86 computer architectures, advanced RISC machine (ARM) architectures, microprocessor without interlocked pipelined stages (MIPS) architectures, scalable processor architectures (SPARCs), load-store architectures, portions of one or more of the same, combinations or variations of one or more of the same, and/or any other suitable architectures or microarchitectures.

In some examples, out-of-band controller 406 can include and/or represent a hardware-implemented device and/or circuit capable of controlling and/or modifying certain hardware features and/or components on an integrated circuit (e.g., an SoC that implements various CPU cores). In one example, out-of-band controller 406 can include and/or represent a device and/or circuit that is onboard (e.g., on-chip) and/or internal to an SoC that implements in-band processor 404. For example, out-of-band controller 406 can include and/or represent a system management unit implemented onboard and/or internal to the SoC. In another example, out-of-band controller 406 can include and/or represent a baseboard management controller implemented outside (e.g., off-chip) and/or external to the SoC that implements in-band processor 404. Additional examples of out-of-band controller 406 include, without limitation, microprocessors, microcontrollers, FPGAs, ASICs, integrated circuits, chiplets, portions of one or more of the same, variations or combinations of one or more of the same, and/or any other suitable out-of-band controller.

In some examples, the term "out-of-band" can refer to any component, circuit, and/or process that is dedicated to and/or supports the control plane (e.g., control data and/or firmware), the management plane, and/or data about the underlying device (e.g., an SoC). In contrast, the term "in-band" can refer to any component, circuit, and/or process that is dedicated to and/or supports the user plane (e.g., user data and/or user applications) running on and/or implemented by a processor (e.g., a CPU core of an SoC). In one example, an SoC's in-band workload can include and/or represent computing tasks performed for and/or in connection with user applications running on a processor, and the SoC's out-of-band workload can include and/or represent computing tasks performed for any other purpose besides utilization and/or consumption by such user applications.

In some examples, computing device 100 and/or machine check architecture 102 are configured and/or equipped with one or more wires capable of communicating fabricated error reports from an outside source 414 to one or more of in-band reporting registers 316 and/or out-of-band reporting registers 318 via pipeline 212. Examples of outside source 414 include, without limitation, agent 104, in-band processor 404, out-of-band controller 406, portions of one or more of the same, variations or combinations of one or more of the same, and/or any other suitable outside source 414. Accordingly, although not necessarily illustrated in this way in FIG. 4, outside source 414 can be the same as one of the devices obtaining, receiving, and/or retrieving a fabricated error report from a reporting register of machine check architecture 102.

Figure 5:
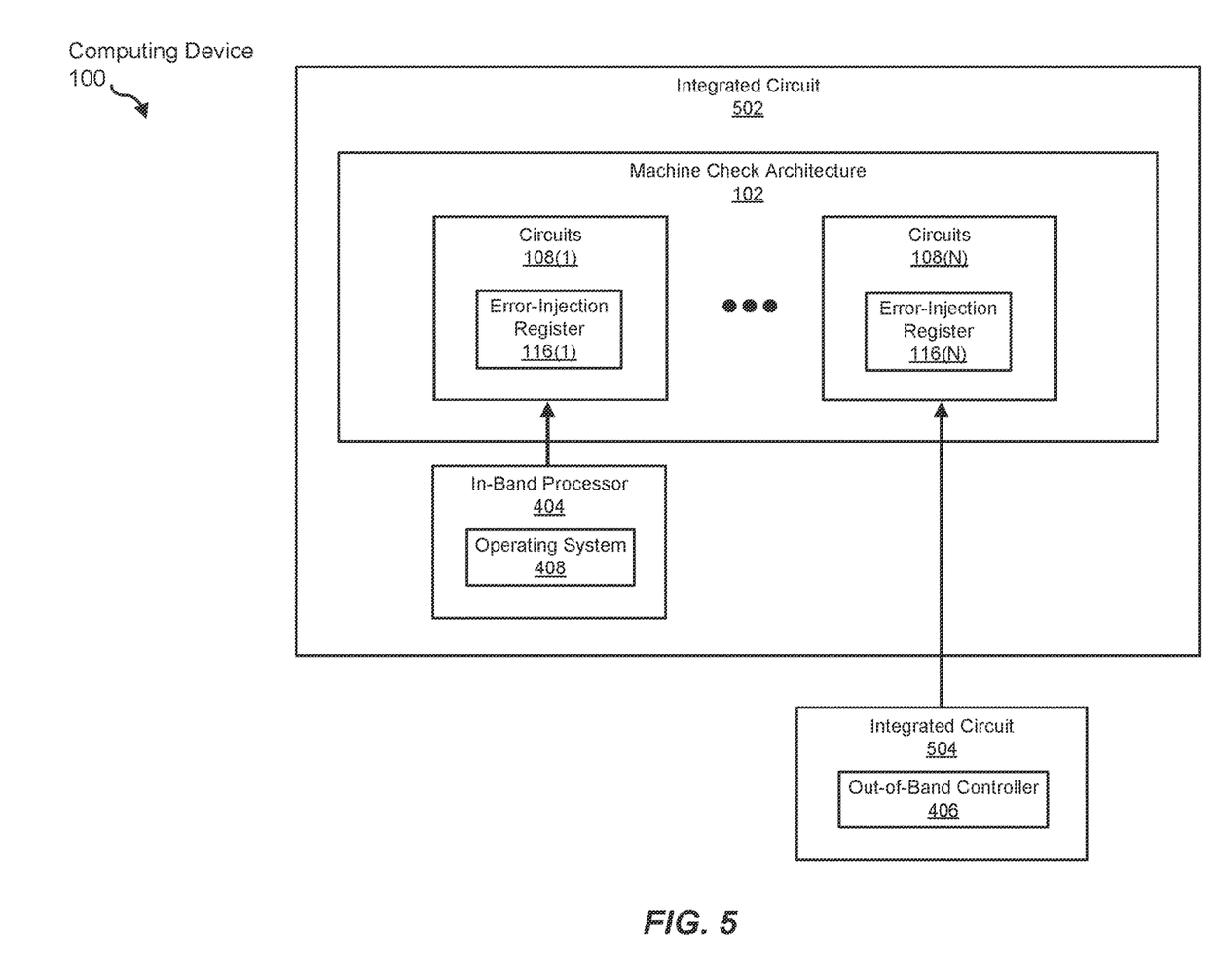
FIG. 5 is a block diagram of an exemplary computing device capable of injecting fabricated errors into machine check architectures according to one or more implementations of this disclosure.

FIG. 5 illustrates an exemplary implementation of computing device 100 that facilitates and/or supports injecting fabricated errors into machine check architectures. In some examples, computing device 100 can include and/or represent certain components and/or features that perform and/or provide functionalities that are similar and/or identical to those described above in connection with any of FIGS. 1-4. In one example, computing device 100 includes and/or represents an integrated circuit 502 and/or an integrated circuit 504 communicatively coupled to one another. In this example, integrated circuit 502 includes and/or represents machine check architecture 102 and/or in-band processor 404, and integrated circuit 504 includes and/or represents out-of-band controller 406. Accordingly, integrated circuit 504 is off-chip from and/or external to integrated circuit 502. However, integrated circuits 502 and 504 can be installed and/or applied to the same circuit board.

In some examples, integrated circuit 502 includes and/or represents an SoC with numerous CPU cores and machine check architecture 102. In one example, in-band processor 404 is on-chip and/or internal to the SoC, and out-of-band controller 406 is off-chip and/or external to the SoC. In this example, in-band processor 404 is able to access the copy of fabricated error reports 326 stored in in-band reporting registers 316 but is restricted from accessing the copy of fabricated error reports 326 stored in out-of-band reporting registers 318. For example, in-band processor 404 can implement and/or execute an operating system 408 that obtains, receives, and/or retrieves the copy of fabricated error reports 326 from in-band reporting registers 316. Additionally or alternatively, out-of-band controller 406 is able to access the copy of fabricated error reports 326 stored in out-of-band reporting registers 318 but is restricted from accessing the copy of fabricated error reports 326 stored in in-band reporting registers 316.

In some examples, in-band processor 404 and out-of-band controller 406 can make error-logging decisions independent of one another. For example, in-band processor 404 can clear a certain flag (e.g., a status flag) in in-band reporting registers 316 that remains set in out-of-band reporting registers 318. Alternatively, out-of-band controller 406 can clear a certain flag (e.g., a status flag) in out-of-band reporting registers 318 that remains set in in-band reporting registers 316. Either way, such flag mismatches across in-band reporting registers 316 and out-of-band reporting registers 318 can cause in-band reporting registers 316 and out-of-band reporting registers 318 to log and/or disregard different errors from the same error reports. Accordingly, in-band processor 404 and out-of-band controller 406 can have independent control and/or programmability over their respective registers in machine check architecture 102.

Figure 6:
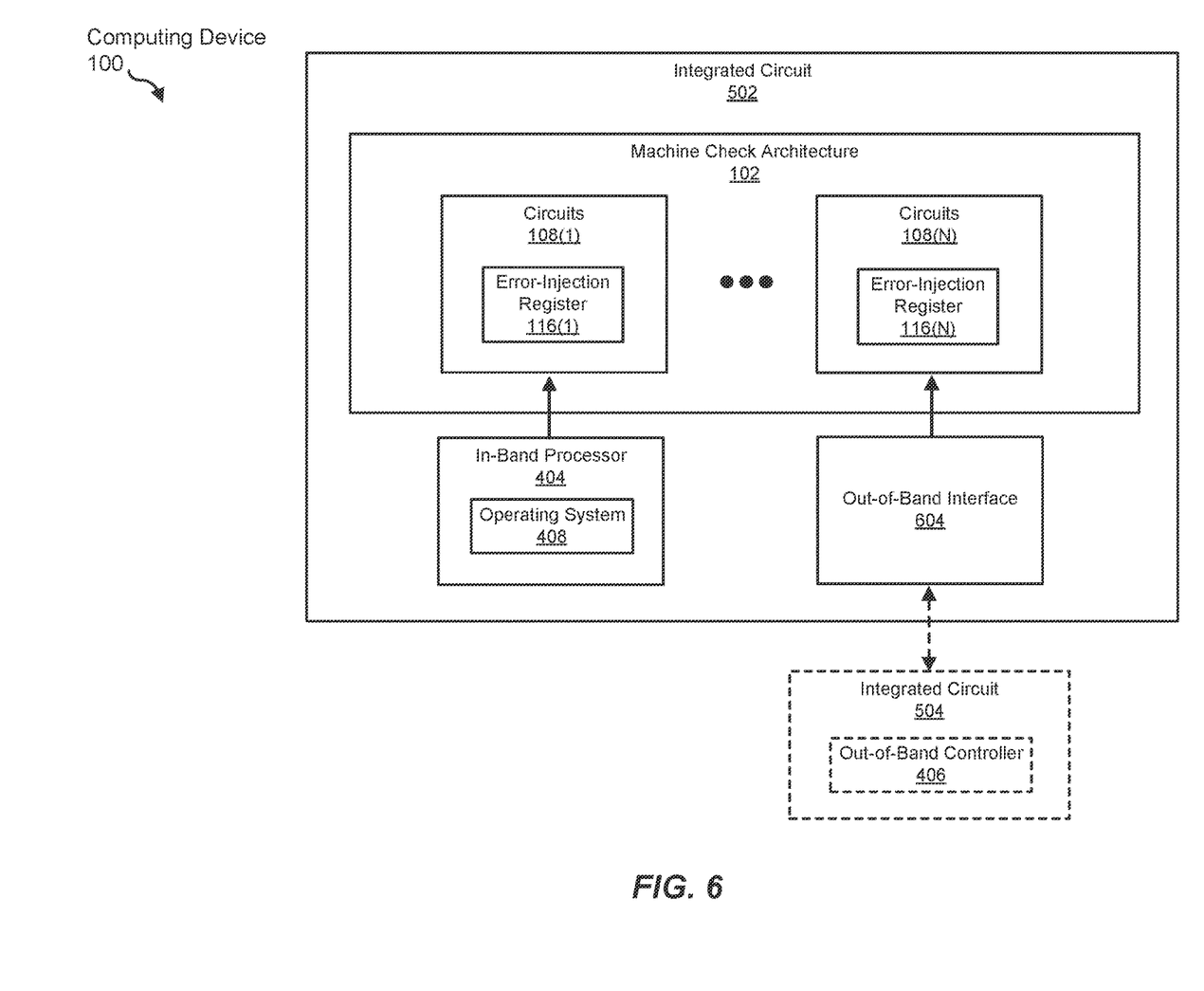
FIG. 6 is a block diagram of an exemplary computing device capable of injecting fabricated errors into machine check architectures according to one or more implementations of this disclosure.

FIG. 6 illustrates another exemplary implementation of computing device 100 that facilitates and/or supports out-of-band delivery of error reports. In some examples, computing device 100 can include and/or represent certain components and/or features that perform and/or provide functionalities that are similar and/or identical to those described above in connection with any of FIGS. 1-5. As illustrated in FIG. 6, exemplary computing device 100 includes and/or represents integrated circuit 502 and/or integrated circuit 504 communicatively coupled to one another. In one example, integrated circuit 502 includes and/or represents machine check architecture 102, in-band processor 404, and/or an out-of-band interface 604. In this example, integrated circuit 504 includes and/or represents out-of-band controller 406 communicatively coupled to out-of-band interface 604, which facilitates access to the copy of fabricated error reports 326 stored in out-of-band reporting registers 318 for out-of-band controller 406.

In some examples, out-of-band interface 604 can include and/or represent a system management unit that obtains, receives, and/or retrieves the copy of fabricated error reports 326 from out-of-band reporting registers 318. Additionally or alternatively, out-of-band controller 406 can include and/or represent a baseboard management controller that interfaces and/or communicates with the system management unit. In one example, the baseboard management controller obtains, receives, and/or retrieves the copy of fabricated error reports 326 from the system management unit.

In some examples, out-of-band controller 406 and/or out-of-band interface 604 can instruct and/or direct machine check architecture 102 to perform one or more specific actions in response to specific errors identified and/or included in fabricated error reports 326. For example, out-of-band controller 406 and/or out-of-band interface 604 can program and/or configure out-of-band reporting registers 318 to initiate and/or trigger a specific action in response to a specific error. In one example, the specific action can include and/or represent triggering an interrupt that notifies out-of-band controller 406 of the specific error. For example, out-of-band interface 604 can be programmed and/or configured to generate the interrupt that notifies out-of-band controller 406 of the specific error.

Similarly, in-band processor 404 and/or operating system 408 can instruct and/or direct machine check architecture 102 to perform one or more specific actions in response to specific errors identified and/or included in fabricated error reports 326. For example, in-band processor 404 and/or operating system 408 can program and/or configure in-band reporting registers 316 to initiate and/or trigger a specific action in response to a specific error. In one example, the specific action can include and/or represent triggering an interrupt that notifies in-band processor 404 and/or operating system 408 of the specific error. For example, machine check architecture 102 and/or in-band reporting register 316 can be programmed and/or configured to generate the interrupt that notifies in-band processor 404 and/or operating system 408 of the specific error.

Figure 7:
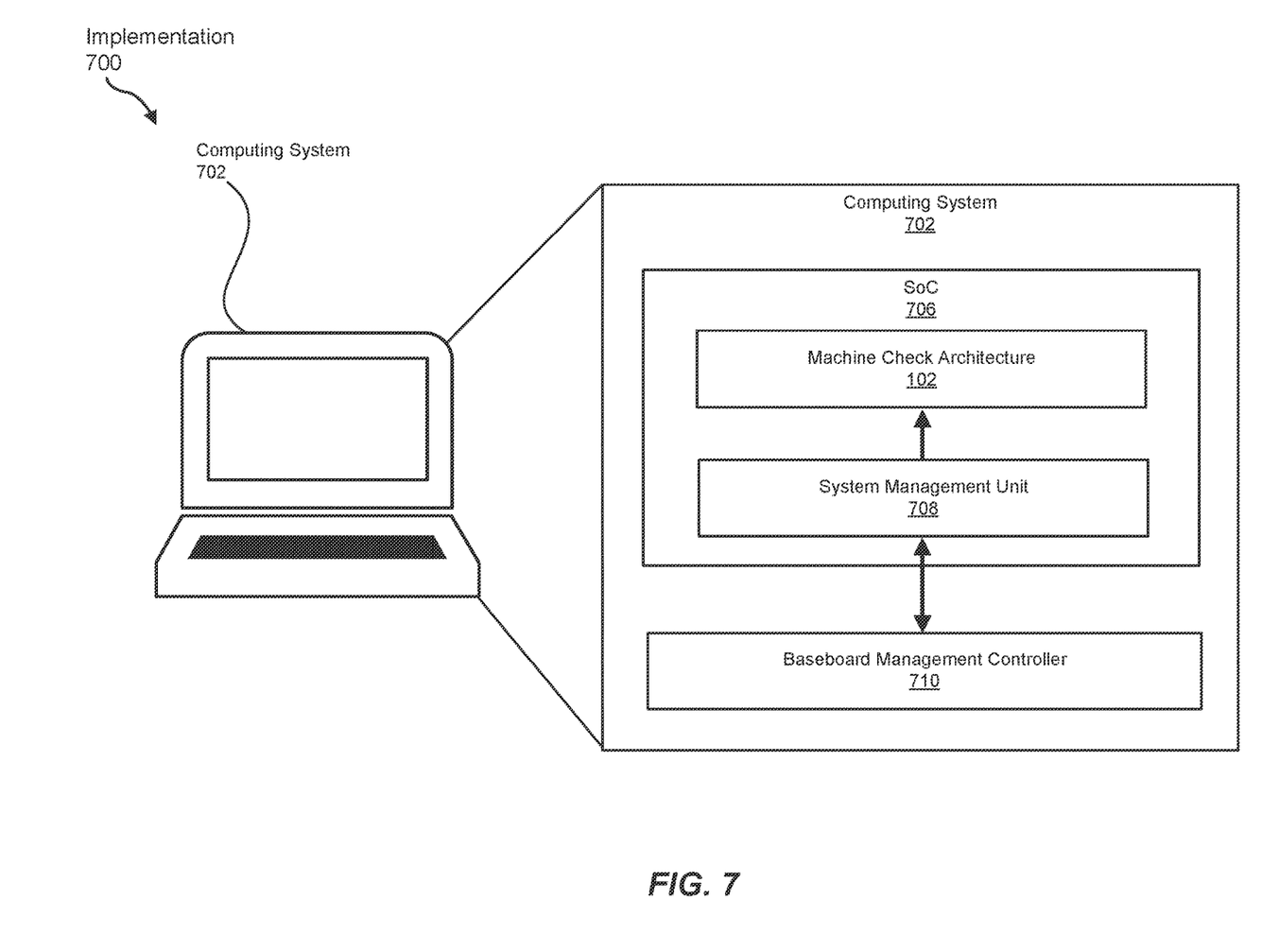
FIG. 7 is a block diagram of an exemplary implementation involving a computing system that facilitates injecting fabricated errors into machine check architectures according to one or more variations of this disclosure.

FIG. 7 illustrates an exemplary implementation 700 involving a computing system 702. In some examples, computing system 702 can include and/or represent certain components and/or features that perform and/or provide functionalities that are similar and/or identical to those described above in connection with any of FIGS. 1-6. As illustrated in exemplary implementation 700 in FIG. 7, computing system 702 includes and/or represents an SoC 706 equipped with machine check architecture 102 and/or a system management unit 708.

In some examples, computing system 702 also includes and/or represents a baseboard management controller 710 that is electrically and/or communicatively coupled to system management unit 708. In one example, system management unit 708 obtains, receives, and/or retrieves a copy of an error report from an out-of-band register in machine check architecture 102. In this example, baseboard management controller 710 then obtains, receives, and/or retrieves the copy of the error report from system management unit 708 for processing and/or to facilitate decision-making.

In some examples, the various devices and/or systems described in connection with FIGS. 1-7 can include and/or represent one or more additional circuits, components, and/or features that are not necessarily illustrated and/or labeled in FIGS. 1-7. For example, computing device 100 can also include and/or represent additional analog and/or digital circuitry, onboard logic, transistors, resistors, capacitors, diodes, inductors, switches, registers, flipflops, connections, traces, buses, semiconductor (e.g., silicon) devices and/or structures, processing devices, storage devices, circuit boards, packages, substrates, housings, combinations or variations of one or more of the same, and/or any other suitable components that facilitate and/or support injecting fabricated errors into machine check architectures. In certain implementations, one or more of these additional circuits, components, devices, and/or features can be inserted and/or applied between any of the existing circuits, components, and/or devices illustrated in FIGS. 1-7 consistent with the aims and/or objectives provided herein. Accordingly, the electrical and/or communicative couplings described with reference to FIGS. 1-7 can be direct connections with no intermediate components, devices, and/or nodes or indirect connections with one or more intermediate components, devices, and/or nodes.

In some examples, the phrase "to couple" and/or the term "coupling", as used herein, can refer to a direct connection and/or an indirect connection. For example, a direct coupling between two components can constitute and/or represent a coupling in which those two components are directly connected to each other by a single node that provides electrical continuity from one of those two components to the other. In other words, the direct coupling can exclude and/or omit any additional components between those two components.

Additionally or alternatively, an indirect coupling between two components can constitute and/or represent a coupling in which those two components are indirectly connected to each other by multiple nodes that fail to provide electrical continuity from one of those two components to the other. In other words, the indirect coupling can include and/or incorporate at least one additional component between those two components.

Figure 8:
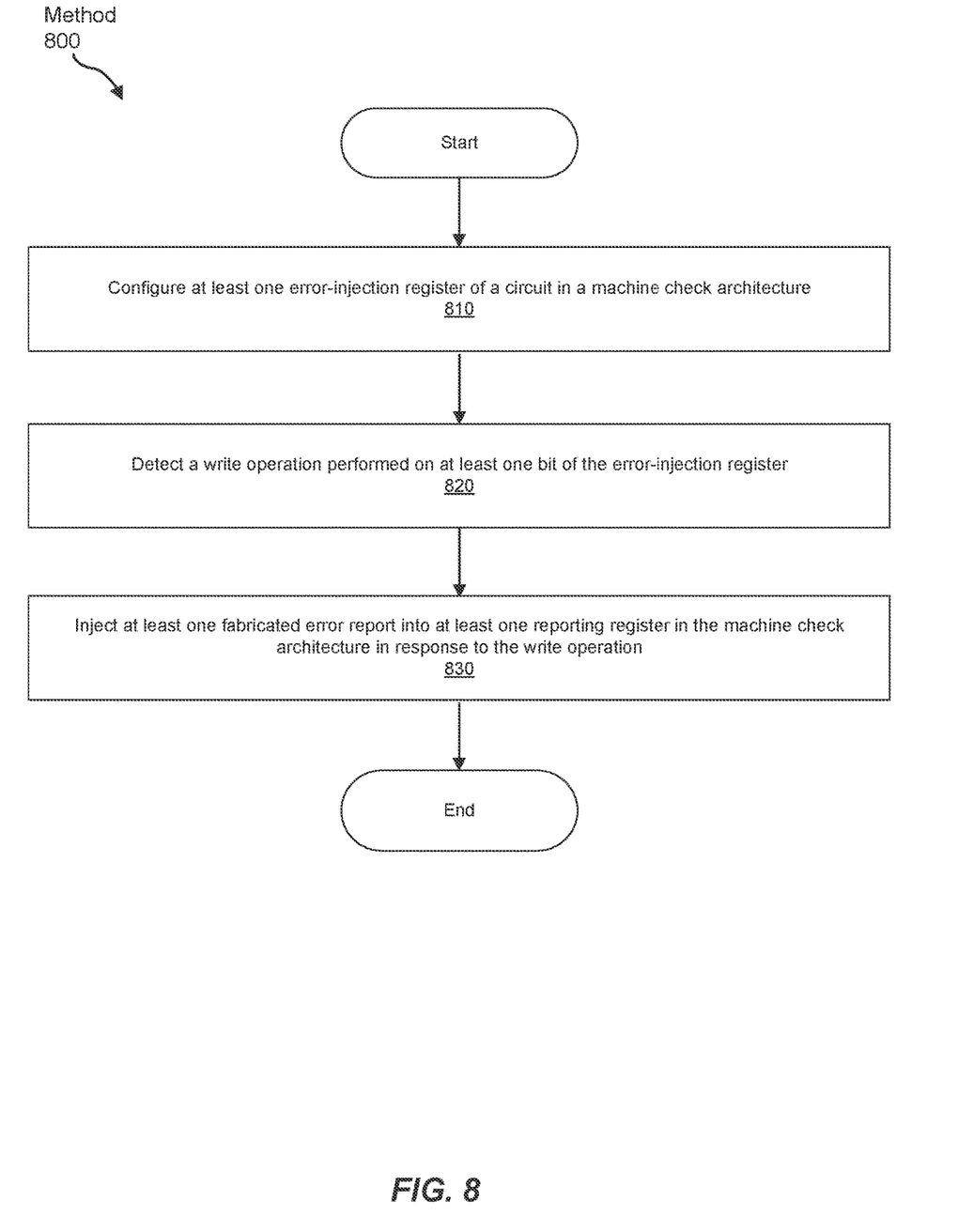
FIG. 8 is a flowchart of an exemplary method for injecting fabricated errors into machine check architectures according to one or more implementations of this disclosure.

FIG. 8 is a flow diagram of an exemplary method 800 for injecting fabricated errors into machine check architectures. In one example, the steps shown in FIG. 8 can be performed and/or executed during the manufacturing, assembly, configuration, and/or operation of a computing device and/or system. Additionally or alternatively, the steps shown in FIG. 8 can also incorporate and/or involve various sub-steps and/or variations consistent with the descriptions provided above in connection with FIGS. 1-7.

As illustrated in FIG. 8, exemplary method 800 includes and/or involves the step of configuring at least one error-injection register of a circuit in a machine check architecture (810). Step 810 can be performed in a variety of ways, including any of those described above in connection with FIGS. 1-7. For example, a portion of a computing device can configure and/or instantiate at least one error-injection register of a circuit in a machine check architecture. In one example, a machine check architecture and/or circuit of the computing device can set and/or clear certain bits of the error-injection register to indicate and/or reflect a certain state (e.g., a state in which no fabricated errors are pending).

Exemplary method 800 also includes and/or involves the step of detecting a write operation performed on at least one bit of the error-injection register (820). Step 820 can be performed in a variety of ways, including any of those described above in connection with FIGS. 1-7. For example, the computing device can monitor and/or check for any write operations performed on the error register. In one example, while monitoring and/or checking for such write operations, an error detector of the machine check architecture can detect a write operation performed on at least one bit of the error-injection register.

Exemplary method 800 further includes and/or involves the step of injecting at least one fabricated error report into at least one reporting register in the machine check architecture in response to the write operation (830). Step 830 can be performed in a variety of ways, including any of those described above in connection with FIGS. 1-7. For example, the computing device can inject and/or insert at least one fabricated error report into at least one reporting register in the machine check architecture in response to the write operation. In one example, the error detector of the machine check architecture can generate at least one fabricated error report and then enter the same into a pipeline of the machine check architecture that carries the fabricated error report to the reporting register.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality. Furthermore, the various steps, events, and/or features performed by such components should be considered exemplary in nature since many alternatives and/or variations can be implemented to achieve the same functionality within the scope of this disclosure.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the instant disclosure. The implementations disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   an agent; and
   a machine check architecture comprising:
      at least one circuit configured to report errors via at least one reporting register; and
      at least one error-injection register configured to cause the at least one circuit to inject at least one fabricated error report into the at least one reporting register in response to a write operation performed by the agent on at least one bit of the at least one error-injection register.

2. The system of claim 1, wherein:
   the at least one circuit comprises a plurality of circuits; and
   the at least one error-injection register comprises a plurality of error-rejection registers.

3. The system of claim 1, wherein the machine check architecture comprises a pipeline configured to carry the error reports from the at least one circuit to the at least one reporting register; and
   the at least one error-injection register is configured to cause the at least one circuit to inject the at least one fabricated error report into the pipeline for transmission to the at least one reporting register.

4. The system of claim 3, wherein the at least one circuit comprises one or more wires configured to communicate another fabricated error report from an outside source to the at least one reporting register via the pipeline.

5. The system of claim 3, wherein the at least one reporting register comprises:
   a first reporting register configured to:
      receive a first copy of the at least one fabricated error report via a first lane of the pipeline; and
      store the first copy of the at least one fabricated error report for access by an in-band processor; and
   a second reporting register configured to:
      receive a second copy of the at least one fabricated error report via a second lane of the pipeline; and
      store the second copy of the at least one fabricated error report for access by an out-of-band controller.

6. The system of claim 1, wherein the agent comprises software or firmware running on a processor with access to the at least one error-injection register.

7. The system of claim 6, further comprising an integrated circuit that incorporates the processor and the machine check architecture.

8. The system of claim 1, wherein the agent comprises an out-of-band controller with access to the at least one error-injection register.

9. The system of claim 8, further comprising:
   a first integrated circuit that incorporates the out-of-band controller; and
   a second integrated circuit that incorporates the machine check architecture.

10. The system of claim 9, wherein the out-of-band controller comprises a baseboard management controller that is external to the second integrated circuit.

11. The system of claim 1, wherein the at least one circuit:
    comprises a table configured to:
       store a plurality of error entries; and
       map the bit of the at least one error-injection register to a specific error entry included in the error entries; and
    is configured to generate the at least one fabricated error report for injection based at least in part on the mapping of the bit to the specific error entry.

12. The system of claim 1, wherein the at least one error-injection register is further configured to cause the at least one circuit to inject another fabricated error report into the at least one reporting register in response to another write operation performed by the agent on at least one other bit of the at least one error-injection register.

13. The system of claim 1, further comprising an out-of-band controller configured to perform a specific action in response to a specific error identified in the at least one fabricated error report injected into the at least one reporting register.

14. The system of claim 13, wherein the specific action comprises triggering an interrupt that notifies at least one other circuit of the specific error.

15. The system of claim 14, wherein the at least one other circuit comprises at least one of:
    a processor disposed on an integrated circuit that includes the machine check architecture; or
    a baseboard management controller that is external to the integrated circuit that includes the machine check architecture.

16. A machine check architecture comprising:
    at least one circuit configured to report errors to a reporting register;
    a pipeline configured to carry the error reports from the at least one circuit to the reporting register; and
    at least one error-injection register configured to cause the at least one circuit to inject at least one fabricated error report into the reporting register via the pipeline in response to a write operation performed by an outside source on at least one bit of the at least one error-injection register.

17. The machine check architecture of claim 16, wherein:
    the at least one circuit comprises a plurality of circuits; and
    the at least one error-injection register comprises a plurality of error-rejection registers.

18. The machine check architecture of claim 16, wherein the at least one circuit comprises one or more wires configured to communicate another fabricated error report from the outside source to the reporting register via the pipeline.

19. The machine check architecture of claim 16, wherein the reporting register comprises:
    a first reporting register configured to:
       receive a first copy of the at least one fabricated error report via a first lane of the pipeline; and
       store the first copy of the at least one fabricated error report for access by an in-band processor; and
    a second reporting register configured to:
       receive a second copy of the at least one fabricated error report via a second lane of the pipeline; and
       store the second copy of the at least one fabricated error report for access by an out-of-band controller.

20. A method comprising:
configuring at least one error-injection register of a circuit in a machine check architecture;
detecting a write operation performed on at least one bit of the at least one error-injection register; and
in response to the write operation, injecting at least one fabricated error report into at least one reporting register in the machine check architecture.

* * * * *